US009777175B2

(12) United States Patent
Liu et al.

(10) Patent No.: US 9,777,175 B2
(45) Date of Patent: Oct. 3, 2017

(54) AQUEOUS PIGMENT DISPERSIONS

(71) Applicant: Cabot Corporation, Boston, MA (US)

(72) Inventors: Tianqi Liu, Boxborough, MA (US);
Andrew P. Dikan, Boston, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 15/269,060

(22) Filed: Sep. 19, 2016

(65) Prior Publication Data

US 2017/0002220 A1 Jan. 5, 2017

Related U.S. Application Data

(63) Continuation of application No. 14/195,901, filed on Mar. 4, 2014, now abandoned.

(60) Provisional application No. 61/772,616, filed on Mar. 5, 2013.

(51) Int. Cl.
| | | |
|---|---|---|
| *C09D 11/36* | (2014.01) | |
| *C09D 11/326* | (2014.01) | |
| *C08K 13/06* | (2006.01) | |
| *C09D 17/00* | (2006.01) | |
| *C09D 11/324* | (2014.01) | |
| *C01B 31/02* | (2006.01) | |
| *C09C 1/48* | (2006.01) | |

(52) U.S. Cl.
CPC ............ *C09D 11/326* (2013.01); *C01B 31/02* (2013.01); *C08K 13/06* (2013.01); *C09C 1/48* (2013.01); *C09D 11/324* (2013.01); *C09D 17/001* (2013.01); *C09D 17/005* (2013.01); *C01P 2006/12* (2013.01); *C01P 2006/19* (2013.01); *C01P 2006/22* (2013.01)

(58) Field of Classification Search
CPC .................................. C09D 11/36; C08K 13/06
See application file for complete search history.

(56) References Cited

U.S. PATENT DOCUMENTS

| | | | |
|---|---|---|---|
| 5,554,739 A | 9/1996 | Belmont | |
| 5,630,868 A | 5/1997 | Belmont et al. | |
| 5,672,198 A | 9/1997 | Belmont | |
| 5,707,432 A | 1/1998 | Adams et al. | |
| 5,837,045 A | 11/1998 | Johnson et al. | |
| 5,851,280 A | 12/1998 | Belmont et al. | |
| 5,885,335 A | 3/1999 | Adams et al. | |
| 5,895,522 A | 4/1999 | Belmont et al. | |
| 5,900,029 A | 5/1999 | Belmont et al. | |
| 5,922,118 A | 7/1999 | Johnson et al. | |
| 5,969,002 A | 10/1999 | Kijlstra et al. | |
| 6,042,643 A | 3/2000 | Belmont et al. | |
| 6,068,688 A | 5/2000 | Whitehouse et al. | |
| 6,103,380 A | 8/2000 | Devonport | |
| 6,123,759 A * | 9/2000 | Mise ........................ | C09C 1/565 106/31.9 |
| 6,221,143 B1 | 4/2001 | Palumbo | |
| 6,337,358 B1 | 1/2002 | Whitehouse et al. | |
| 6,350,519 B1 | 2/2002 | Devonport | |
| 6,368,239 B1 | 4/2002 | Devonport et al. | |
| 6,372,820 B1 | 4/2002 | Devonport | |
| 6,398,858 B1 | 6/2002 | Yu et al. | |
| 6,472,471 B2 | 10/2002 | Cooke et al. | |
| 6,478,863 B2 | 11/2002 | Johnson et al. | |
| 6,494,943 B1 | 12/2002 | Yu et al. | |
| 6,534,569 B2 | 3/2003 | Mahmud et al. | |
| 6,551,393 B2 | 4/2003 | Devonport et al. | |
| 6,660,075 B2 | 12/2003 | Bergemann et al. | |
| 6,664,312 B2 | 12/2003 | Devonport | |
| 6,811,601 B2 | 11/2004 | Borzyk et al. | |
| 6,831,194 B2 | 12/2004 | Srinivas | |
| 6,852,158 B2 | 2/2005 | Belmont et al. | |
| 6,911,073 B2 | 6/2005 | Adams et al. | |
| 6,929,889 B2 | 8/2005 | Belmont | |
| 6,936,097 B2 | 8/2005 | Shakhnovich | |
| 6,942,724 B2 | 9/2005 | Yu | |
| 7,056,962 B2 | 6/2006 | Johnson et al. | |
| 7,173,078 B2 | 2/2007 | Lamprey et al. | |
| 2001/0036994 A1 | 11/2001 | Bergemann et al. | |
| 2003/0101901 A1 | 6/2003 | Bergemann et al. | |
| 2003/0195274 A1 | 10/2003 | Nakamura et al. | |
| 2004/0171725 A1 | 9/2004 | Richardson et al. | |
| 2006/0201380 A1 | 9/2006 | Kowalski et al. | |
| 2006/0260505 A1 | 11/2006 | Ham et al. | |
| 2007/0149646 A1 | 6/2007 | Nagashima | |
| 2009/0234063 A1 | 9/2009 | Sekiyama | |
| 2011/0244135 A1 | 10/2011 | Sugimoto et al. | |
| 2012/0092598 A1 | 4/2012 | Kyrlidis et al. | |
| 2014/0013996 A1 | 1/2014 | Dikan et al. | |

FOREIGN PATENT DOCUMENTS

| | | |
|---|---|---|
| CA | 2351162 | 12/2001 |
| DE | 10026466 A1 | 11/2001 |

(Continued)

OTHER PUBLICATIONS

U.S. Appl. No. 61/671,359, filed Jul. 13, 2012.

(Continued)

*Primary Examiner* — Veronica F Faison

(57) ABSTRACT

Disclosed herein are aqueous dispersions comprising: at least one pigment present in an amount of at least 10% by weight relative to the total weight of the dispersion, the at least one pigment being selected from oxidized carbon blacks and modified carbon blacks having attached at least one organic group; and at least one organic solvent present in an amount of at least 10% by weight relative to the total weight of the dispersion, the at least one organic solvent having a Hansen hydrogen bonding parameter ($\delta_H$) ranging from 13 to 50 $MPa^{0.5}$, and a Hansen polarity parameter ($\delta_p$) ranging from 5 to 13 $MPa^{0.5}$, wherein the dispersion is substantially free of a surfactant. Also disclosed are methods of preparing aqueous dispersions and injet ink compositions prepared from the same.

34 Claims, No Drawings

(56) References Cited

FOREIGN PATENT DOCUMENTS

| | | |
|---|---|---|
| EP | 1394221 A1 | 3/2004 |
| JP | H10-292141 A | 11/1998 |
| JP | 2000-345086 A | 12/2000 |
| JP | 2002-538280 A | 11/2002 |
| JP | 2007-119512 A | 5/2007 |
| JP | 2011-213846 A | 10/2011 |
| JP | 2001-329205 A | 11/2011 |
| WO | WO 99/23174 | 5/1999 |
| WO | WO 01/51566 A1 | 7/2001 |
| WO | WO 2004/063289 A2 | 7/2004 |
| WO | WO 2009/048564 A2 | 4/2009 |
| WO | WO 2010/059939 A1 | 5/2010 |
| WO | WO 2010/080686 A1 | 7/2010 |
| WO | WO 2010/141071 A1 | 12/2010 |
| WO | WO 2011/143533 A2 | 11/2011 |
| WO | WO 2014/012002 A2 | 1/2014 |

OTHER PUBLICATIONS

International Search Report and the Written Opinion of the International Searching Authority, or The Declaration for International Application No. PCT/US2014/020066, mailed on May 21, 2014.

* cited by examiner

AQUEOUS PIGMENT DISPERSIONS

RELATED APPLICATION

This application is a continuation of U.S. application Ser. No 14/195,901, filed Mar. 4, 2014 which claims priority under 35 U.S.C. §119(e) to U.S. Provisional Application No. 61/772,616, filed Mar. 5, 2013, the disclosure of which is incorporated herein by reference.

FIELD OF THE INVENTION

Disclosed herein are aqueous pigment dispersions comprising organic solvents. These dispersions can be used for inkjet ink applications.

BACKGROUND

There is a continual need to optimize dispersion stability, such as aqueous dispersions comprising pigments for use in a number of applications, e.g., inks, coatings, etc.

SUMMARY

One embodiment provides an aqueous dispersion comprising:

at least one pigment present in an amount of at least 5% by weight relative to the total weight of the dispersion, the at least one pigment being selected from oxidized carbon blacks and modified carbon blacks having attached at least one organic group; and at least one organic solvent present in an amount of at least 10% by weight relative to the total weight of the dispersion, the at least one organic solvent having a Hansen hydrogen bonding parameter ($\delta_H$) ranging from 13 to 50 $MPa^{0.5}$, and a Hansen polarity parameter ($\delta_p$) ranging from 5 to 13 $MPa^{0.5}$, wherein the dispersion is substantially free of a surfactant.

Another embodiment provides an aqueous dispersion comprising:

at least one pigment present in an amount of at least 10% by weight relative to the total weight of the dispersion, the at least one pigment being selected from oxidized carbon blacks and modified carbon blacks having attached at least one organic group; and at least one organic solvent present in an amount of at least 10% by weight relative to the total weight of the dispersion, wherein, the at least one organic solvent is selected from glycerol, ethylene glycol, 1,2-hexanediol, diethylene glycol, trimethylolpropane, 2-pyrrolidone, triethylene glycol, 1,3-propanediol, 1,3-dimethyl-2-imidazolidinone, 1,2,3,4-tetrahydroxybutane, bis(2-hydroxyethyl)-5,5-dimethylhydantoin, propylene glycol, dipropylene glycol, tripropylene glycol, N-(2-hydroxyethyl)-2-pyrrolidone, trimethylene glycol, 1,4-butanediol, and ethylene glycol monomethyl ether, wherein the dispersion is substantially free of a surfactant.

Another embodiment provides a method of preparing an aqueous dispersion, comprising:

providing a composition comprising at least 10 wt % of a pigment selected from oxidized carbon blacks and modified carbon blacks having attached at least one organic group; and adding to the composition at least one organic solvent to prepare a dispersion substantially free of a surfactant, the at least one organic solvent being present in an amount of at least 10% by weight relative to the total weight of the dispersion, whereupon the adding, the dispersion possesses at least one of the properties selected from:

(a) the conductivity does not increase;

(b) $D_{50}$ does not increase by more than 5% upon 7 days aging at 70° C.;

(c) the viscosity does not increase upon 7 days aging at 70° C.; and (d) the viscosity does not increase by more than 100%.

DETAILED DESCRIPTION

Carbon black pigments modified with various surface treatments have proven useful as self-dispersible pigments in aqueous solutions. For example, inkjet ink compositions comprising ozone-oxidized carbon blacks provide superior optical density, paper to paper performance independence, and improved durability with polymer additives. However, this surface modification of carbon black can compromise dispersion stability, as observed by particle size growth and/or conductivity increase upon aging. Because many inkjet ink manufacturers obtain pigments as aqueous dispersions, there is a need to provide pigment dispersions having sufficient stability to allowing these dispersions to be stored prior to use, e.g., in ink formulations.

It has been discovered that certain organic solvents either stabilize or provide added stability to aqueous dispersions that are free of a surfactant or dispersant. Accordingly, disclosed herein are aqueous dispersions comprising:

at least one pigment present in an amount of at least 5% by weight relative to the total weight of the dispersion, the at least one pigment being selected from oxidized carbon blacks and modified carbon blacks having attached at least one organic group; and at least one organic solvent present in an amount of at least 10% by weight relative to the total weight of the dispersion, the at least one organic solvent having a Hansen hydrogen bonding parameter ($\delta_H$) ranging from 13 to 50 $MPa^{0.5}$, and a Hansen polarity parameter ($\delta_p$) ranging from 5 to 13 $MPa^{0.5}$, wherein the dispersion is substantially free of a surfactant.

Generally, aqueous particle dispersions comprising modified carbon blacks are electrostatically stable in water based on zeta potential measurements (≤−20 mV). Charge is distributed about the pigment in the form of an electric double layer including a Stern layer (made of ions adsorbed to the surface) and a diffuse layer. The thickness of the electric double layer can be gauged by zeta potentials, which is the potential experienced at the diffuse layer. A higher zeta potential results from a greater double layer thickness, leading to a greater amount of repulsion between particles, preventing aggregation and settling of the pigment. Moreover, in the case of modified carbon blacks disclosed herein, such pigments feature additional surface functional groups (e.g., carboxylates, hydroxyls, anhydrides, sulfonates, phosphonates) as compared to untreated carbon blacks, providing additional sites for charged species (e.g., counterions) to adsorb and leading to greater double layer thicknesses.

If an organic solvent was added to an aqueous dispersion to form water/solvent mixtures, it would have been expected that the lower dielectric constant of the organic solvents relative to water would result in a decreased double layer thickness and thus, a less stable dispersion. However, it was discovered that the addition of solvents having certain Hansen solubility parameters actually afforded greater dispersion stability. Without wishing to be bound by any theory, it is believed that certain organic solvents can adsorb and/or otherwise associate with the pigment surface, and can displace surface-adsorbed/condensed ionic groups, and/or otherwise prevent or reduce the presence of ionic groups condensed at the pigment surface. The adsorbed solvent molecules can also prevent desorption of fragments that may have otherwise dissociated from the pigment upon heat aging. Additionally or alternatively, the organic solvents can adhere more closely to the pigment surface to lower the undesirable entropy decrease resulting from organized water structures positioned near the hydrophobic portion of the pigment surface. This end result can also lead to greater dispersion stability.

In one embodiment, Hansen solubility parameters can be used as a measure of compatibility between organic solvents and the pigment surface. Specifically, the polarity ($\delta_p$) and hydrogen bonding ($\delta_H$) parameters (units $MPa^{1/2}$), provide an indication of permanent dipole and hydrogen bonding molecular interactions, respectively. Without wishing to be bound by any theory, solvents having the $\delta_p$ and $\delta_H$ values as disclosed herein, would result in increased compatibility with the pigment surfaces through greater interaction with the surface compared to ionic groups present in the dispersion.

In one embodiment, the at least one organic solvent has a Hansen hydrogen bonding parameter ($\delta_H$) ranging from 13 to 50 $MPa^{0.5}$, e.g., from 15 to 50 $MPa^{0.5}$, from 15 to 45 $MPa^{0.5}$, from 15 to 30 $MPa^{0.5}$, or from 25 to 50 $MPa^{0.5}$. In one embodiment, the at least one organic solvent has a Hansen polarity parameter ($\delta_p$) ranging from 5 to 13 $MPa^{0.5}$, e.g., from 7 to 13 $MPa^{0.5}$, or from 10 to 13 $MPa^{0.5}$. In one embodiment, where the at least one organic solvent comprises two or more organic solvents, each of the two or more organic solvents satisfies the above Hansen solubility parameters.

In one embodiment, the at least one organic solvent is selected from glycerol, ethylene glycol, 1,2-hexanediol, diethylene glycol, trimethylolpropane, 2-pyrrolidone, triethylene glycol, 1,3-propanediol, 1,3-dimethyl-2-imidazolidinone, 1,2,3,4-tetrahydroxybutane, bis(2-hydroxyethyl)-5,5-dimethylhydantoin, propylene glycol, dipropylene glycol, tripropylene glycol, N-(2-hydroxyethyl)-2-pyrrolidone, trimethylene glycol, 1,4-butanediol, and ethylene glycol monomethyl ether.

In one embodiment, the at least one organic solvent is selected from glycerol, trimethylolpropane, xylitol, sorbitol, 2-pyrrolidone, ethylene glycol, 1,2-hexanediol, and 1,3-dimethyl-2-imidazolidinone. In another embodiment, the at least one organic solvent is selected from trimethylolpropane, xylitol, sorbitol, 2-pyrrolidone, ethylene glycol, 1,2-hexanediol, and 1,3-dimethyl-2-imidazolidinone. In yet another embodiment, the at least one organic solvent is selected from glycerol, trimethylolpropane, xylitol, sorbitol, 2-pyrrolidone, 1,2-hexanediol, and 1,3-dimethyl-2-imidazolidinone.

In one embodiment, the at least one organic solvent is selected from alcohols. Exemplary alcohols include glycerol, ethylene glycol, 1,2-hexanediol, diethylene glycol, trimethylolpropane, triethylene glycol, 1,3-propanediol, 1,2,3,4-tetrahydroxybutane, bis(2-hydroxyethyl)-5,5-dimethylhydantoin, propylene glycol, dipropylene glycol, tripropylene glycol, N-(2-hydroxyethyl)-2-pyrrolidone, trimethylene glycol, 1,4-butanediol, and ethylene glycol monomethyl ether.

In one embodiment, the alcohols are selected from diols and polyols, such as alkylene diols and alkylene polyols (e.g., glycols). Exemplary diols and polyols include glycerol, ethylene glycol, 1,2-hexanediol, diethylene glycol, trimethylolpropane, triethylene glycol, 1,3-propanediol, 1,2,3,4-tetrahydroxybutane, bis(2-hydroxyethyl)-5,5-dimethylhydantoin, propylene glycol, dipropylene glycol, tripropylene glycol, trimethylene glycol, and 1,4-tanediol. In one embodiment, the diols and polyols are selected from glycerol, trimethylolpropane, xylitol, sorbitol, ethylene glycol, and 1,2-hexanediol. In another embodiment, the diols and polyols are selected from trimethylolpropane, xylitol, sorbitol, ethylene glycol, and 1,2-hexanediol. In another embodiment, the diols and polyols are selected from glycerol, trimethylolpropane, xylitol, sorbitol, and 1,2-hexanediol. In yet another embodiment, the diols and polyols are selected from glycerol and ethylene glycol.

In one embodiment, the at least one organic solvent is present in the dispersion in an amount ranging from 10% to 40% by weight relative to the total weight of the dispersion, e.g., an amount ranging from 10% to 30%. In another embodiment, the at least one organic solvent is present in an amount of at least 20% by weight, e.g., an amount of at least 30% by weight, or an amount ranging from 20% to 40%, or from 30% to 40% by weight.

In one embodiment, the aqueous dispersion comprises water in an amount of at least 50% by weight, relative to the total weight of the aqueous dispersion. In another embodiment, the aqueous dispersion comprises water in an amount of at least 60% by weight, at least 70% by weight, or at least 80% by weight, or in an amount ranging from 50% to 90% by weight, from 60% to 90% by weight, from 70% to 90% by weight, from 50% to 80% by weight, or from 60% to 80% by weight.

In one embodiment, "substantially free of a surfactant" refers to an amount of surfactant less than 0.2% by weight relative to the total weight of the dispersion, e.g., less than 0.1% by weight, less than 0.05% by weight, or less than 0.01% by weight, relative to the total weight of the dispersion.

The dispersion can be prepared using any method known in the art. For example, the modified pigment in a dry form may be combined with the liquid vehicle with agitation to produce a stable dispersion. Any equipment known in the art, such as a media or ball mill, or other high shear mixing equipment can be used, and various conventional milling media may also be used. Other methods for forming the dispersion will be known to one skilled in the art.

In one embodiment, the only solvents in the aqueous dispersion are water and at least one organic solvent, the latter of which may comprise one or more solvents, each having a Hansen hydrogen bonding parameter ($\delta_H$) ranging from 13 to 50 $MPa^{0.5}$, and a Hansen polarity parameter ($\delta_p$) ranging from 5 to 13 $MPa^{0.5}$, or other ranges as disclosed herein. Accordingly, one embodiment provides an aqueous dispersion, consisting essentially of (or consisting of):

at least one pigment selected from oxidized carbon blacks and modified carbon blacks, wherein the pigment is present in an amount of at least 5% by weight relative to the total weight of the dispersion;

at least one organic solvent present in an amount of at least 10% by weight relative to the total weight of the dispersion, the at least one organic solvent having a Hansen hydrogen bonding parameter ($\delta_H$) ranging from 13 to 50 $MPa^{0.5}$, and a Hansen polarity parameter ($\delta_p$) ranging from 5 to 13 $MPa^{0.5}$, and water.

Another embodiment provides an aqueous dispersion, consisting essentially of (or consisting of):

at least one pigment selected from oxidized carbon blacks and modified carbon blacks, wherein the pigment is present in an amount of at least 5% by weight relative to the total weight of the dispersion;

at least one organic solvent present in an amount of at least 10% by weight relative to the total weight of the dispersion, the at least one organic solvent having a Hansen hydrogen bonding parameter ($\delta_H$) ranging from 13 to 50 MPa$^{0.5}$, and a Hansen polarity parameter ($\delta_p$) ranging from 5 to 13 MPa$^{0.5}$;

at least one biocide and/or fungicide; and water.

In one embodiment, the pigment is present in the aqueous dispersion in amount of at least 5% to 40%, e.g., an amount ranging from 5% to 35%, an amount ranging from 5% to 30%, or an amount of at least 10%, e.g., an amount ranging from 10% to 40%, or an amount ranging from 10% to 35% by weight, relative to the total weight of the dispersion.

The stability of a dispersion upon adding the at least one organic solvent (e.g., in an amount of at least 10% or at least 20% by weight, or other amounts as disclosed herein) can be assessed by one or more of the following properties:

(a) the conductivity does not increase;

(b) $D_{50}$ does not increase by more than 5% upon 7 days aging at 70° C.;

(c) the viscosity does not increase upon 7 days aging at 70° C.; and (d) the viscosity does not increase by more than 100%.

Without wishing to be bound by any theory, one or more of the properties (a) to (d) can contribute to dispersion instability. Upon aging, an increase in conductivity may result from ionic species released due to desorption of adsorbed species or degradation of carbon black. An increase in viscosity can also occur, potentially leading to gelation. An increase in the particle size, as measured by $D_{50}$, results in a greater tendency of the particles to settle out of solution. It has been a surprising discovery that the addition of certain solvents can affect the stability of aqueous pigment dispersions by controlling one or more of the properties (a) to (d).

Another embodiment provides a method of preparing an aqueous dispersion, comprising:

providing a composition comprising at least 5 wt % of a pigment selected from oxidized carbon blacks and modified carbon blacks having attached at least one organic group; and adding to the composition at least one organic solvent to prepare a dispersion substantially free of a surfactant, the at least one organic solvent being present in an amount of at least 10% (e.g., at least 20%) by weight relative to the total weight of the dispersion, whereupon the adding, the dispersion possesses at least one of the properties selected from:

(a) the conductivity does not increase;

(b) $D_{50}$ does not increase by more than 5% upon 7 days aging at 70° C.;

(c) the viscosity does not increase upon 7 days aging at 70° C.; and (d) the viscosity does not increase by more than 100%.

It is understood that properties (a)-(d) are in comparison with the dispersion before the adding.

Pigments

In one embodiment, the at least one pigment is selected from oxidized carbon blacks. Accordingly, one embodiment provides an aqueous dispersion, comprising:

at least one pigment selected from oxidized carbon blacks, wherein the pigment is present in an amount of at least 5%, at least 10%, an amount ranging from 5% to 35%, an amount ranging from 5% to 40%, or an amount ranging from 10% to 40% by weight relative to the total weight of the dispersion; and at least one organic solvent (e.g., selected from alcohols) present in an amount of at least 10% by weight relative to the total weight of the dispersion, the at least one organic solvent having a Hansen hydrogen bonding parameter ($\delta_H$) ranging from 13 to 50 MPa$^{0.5}$, and a Hansen polarity parameter ($\delta_p$) ranging from 5 to 13 MPa$^{0.5}$, wherein the dispersion is substantially free of a surfactant.

For example, the oxidized carbon black can have an oxygen content greater than or equal to 3%. Generally, oxidized blacks feature a surface having ionic or ionizable, oxygen-containing groups such as one or more of phenols, lactones, carbonyls, carboxyls (e.g., carboxylic acids), anhydrides, ethers, and quinones. The extent of oxidation of carbon black can determine the surface concentration of such ionic or ionizable groups. The carbon blacks disclosed herein can be oxidized by a variety of oxidizing agents known in the art. Exemplary oxidizing agents for carbon blacks include oxygen gas, ozone, peroxides such as hydrogen peroxide, persulfates such as sodium and potassium persulfate, hypohalites such as sodium hypochlorite, nitric acid, and transition metal-containing oxidants such as permanganate salts, osmium tetroxide, chromium oxides, ceric ammonium nitrates, and mixtures thereof.

In one embodiment, the carbon blacks disclosed herein are oxidized via ozone oxidation. In one embodiment, the ozone oxidation is performed as described in U.S. Provisional Application No. 61/671,359, filed Jul. 13, 2012, and PCT Publication No. PCT/US2013/050295, the disclosures of which are incorporated herein by reference.

In one embodiment, the at least one pigment is selected from modified carbon blacks having attached at least one organic group. In one embodiment, an "attached" organic group can be distinguished from an adsorbed group in that a soxhlet extraction for several hours (e.g., at least 4, 6, 8, 12, or 24 hours) will not remove the attached group from the pigment. In another embodiment, the organic group is attached to the pigment if the organic group cannot be removed after repeated washing with a solvent or solvent mixture that can dissolve the starting organic treating material but cannot disperse the treated pigment. In yet another embodiment, "attached" refers to a bond such as a covalent bond, e.g., a pigment bonded or covalently bonded to a nucleophile or organic group.

In one embodiment, the at least one organic group can be attached either directly (bonding to a native atom of the carbon black) or indirectly via an intermediary or spacer group. In one embodiment, the intermediary or spacer group is selected from substituted and unsubstituted $C_1$-$C_{12}$ alkyl, $C_5$-$C_{20}$ aryl, $C_6$-$C_{24}$ alkyaryl and aralkyl, wherein "alkyl" can be optionally interrupted by a group containing a heteroatom selected from N, O, and S, and "aryl" includes ring carbon atoms optionally replaced by a group containing a heteroatom selected from N, O, and S. Typically, the attached group resides at the pigment surface.

In one embodiment, the at least one organic group comprises at least one substituent selected from carboxylic acids, sulfonic acids, phosphonic acids, hydroxyls, amines, and esters, amides, and salts thereof.

In one embodiment, the at least one organic group comprises the formula —[R(A)]-, wherein:

R is attached to the carbon black and is selected from arylene, heteroarylene, and alkylene, and A is selected from carboxylic acids, sulfonic acids, phosphonic acids, hydroxyls, amines, and esters, amides, and salts thereof.

The arylene, heteroarylene, and alkylene can be unsubstituted or substituted. Exemplary arylenes include phenylene, naphthylene, and biphenylene, and exemplary heteroarylenes include phenylene, naphthylene, and biphenylene having a ring carbon substituted with one or more oxygen or nitrogen atoms. In one embodiment, the arylene is a $C_5$-$C_{20}$ arylene. Heteroarylenes can be an arylene as defined herein which one or more ring carbon atoms is replaced with a heteroatom, e.g., N, O, and S. The heteroatom can be bonded to other groups in addition to being a ring atom. Alkylenes may be branched or unbranched. The alkylene may be a $C_1$-$C_{12}$ alkylene such as methylene, ethylene, propylene, or butylene.

In one embodiment, the attached organic group comprises at least one ionic group, ionizable group, or mixtures of an ionic group and an ionizable group. An ionic group can be either anionic or cationic and can be associated with a counterion of the opposite charge including inorganic or organic counterions, such as $Na^+$, $K^+$, $Li^+$, $NH_4^+$, $NR'_4^+$, acetate, $NO_3^-$, $SO_4^{-2}$, $R'SO_3^-$, $R'OSO_3^-$, $OH^-$, or $Cl^-$, where R' represents hydrogen or an organic group, such as a substituted or unsubstituted aryl or alkyl group. An ionizable group is one that is capable of forming an ionic group in the medium of use. Anionic groups are negatively charged ionic groups that can be generated from groups having ionizable substituents that can form anions (anionizable groups), such as acidic substituents. Cationic groups are positively charged organic ionic groups that can be generated from ionizable substituents that can form cations (cationizable groups), such as protonated amines. Specific examples of anionic groups include —$COO^-$, -$SO_3^-$, —$OSO_3^-$, —$HPO_3^-$; —$OPO_3^{-2}$, or —$PO_3^{-2}$, and specific examples of an anionizable group can include —COOH, —$SO_3H$, —$PO_3H_2$, —R'SH, or —R'OH, where R' represents hydrogen or an organic group, such as a substituted or unsubstituted aryl or alkyl group. Also, specific examples of cationic or cationizable groups include alkyl or aryl amines, which can be protonated in acidic media to form ammonium groups —$NR'_2H^+$, where R' represent an organic group, such as a substituted or unsubstituted aryl or alkyl groups.

In one embodiment, the attached organic group comprises a polymer. In one embodiment, the polymer comprises at least one non-ionic group. Examples include alkylene oxide groups of from 1 to 12 carbons and polyols, such as a —$CH_2$—$CH_2$— group, a —$CH(CH_3)$—$CH_2$— group, a —$CH_2$—$CH(CH_3)$— group, a —$CH_2CH_2CH_2$— group, or combinations thereof. These non-ionic groups may further comprise at least one ionic or ionizable group as disclosed herein.

In one embodiment, the polymer has a low acid number. In one embodiment, the polymer may be an acidic group containing polymer having an acid number of less than or equal to 200, such as less than or equal to 150, less than or equal to 110, or less than or equal to 100. In another embodiment, the acid number of the polymer is greater than or equal to 30. Thus, the polymer may be an acidic group containing polymer having an acid number of from 30 to 200, such as from 30 to 110, from 110 to 150, or from 150 to 200.

The amount of attached organic groups can be varied, depending on the desired use of the modified carbon black and the type of attached group. For example, the total amount of organic group may be from about 0.01 to about 10.0 micromoles of groups/$m^2$ surface area of pigment, as measured by nitrogen adsorption (BET method), including from about 0.5 to about 5.0 micromoles/$m^2$, from about 1 to about 3 micromoles/$m^2$, or from about 2 to about 2.5 micromoles/$m^2$. Additional attached organic groups, which differ from those described for the various embodiments of the present invention, may also be present.

In one embodiment, the carbon black is modified with at least one organic group via a diazonium treatment as detailed, for instance, in the following patents: U.S. Pat. Nos. 5,554,739; 5,630,868; 5,672,198; 5,707,432; 5,851,280; 5,885,335; 5,895,522; 5,900,029; 5,922,118; 6,042,643; 6,534,569; 6,398,858 and 6,494,943 (high shear conditions) U.S. Pat. Nos. 6,372,820; 6,368,239; 6,350,519; 6,337,358; 6,103,380; 7,173,078; 7,056,962; 6,942,724; 6,929,889; 6,911,073; 6,478,863; 6,472,471; and WO 2011/143533, the disclosures of which are incorporated herein by reference. In one embodiment, the attachment is provided via a diazonium reaction where the at least one organic group has a diazonium salt substituent. In another embodiment, the direct attachment can be formed by using the diazonium and stable free radical methods described, for instance, in U.S. Pat. Nos. 6,068,688; 6,337,358; 6,368,239; 6,551,393; 6,852,158, the disclosures of which are incorporated herein by reference, which makes use of reacting at least one radical with at least one particle, wherein a radical is generated from the interaction of at least one transition metal compound with at least one organo-halide compound in the presence of one or more particles capable of radical capture, and the like. In yet another embodiment, the at least one carbon black can be modified (e.g., to attach functional groups) by using the methods of U.S. Pat. Nos. 5,837,045, 6,660,075 and WO 2009/048564 (reaction with organic compounds containing a C—C double bond or triple bond activated by at least one substituent) or U.S. Pub. No. 2004/0171725, U.S. Pat. Nos. 6,664,312, 6,831,194 (reaction with anhydride component), U.S. Pat. No. 6,936,097, U.S. Pub. Nos. 2001/0036994, 2003/0101901 (reaction with organic groups having —N=N—N— group), Canadian Patent No. 2,351,162, European Patent No. 1 394 221, and PCT Publication Nos. WO 01/51566 (reaction between at least one electrophile and at least one nucleophile), WO 04/63289, WO 2010/141071 (reaction with H2N-A-Y where A is a heteroatom), and WO 99/23174, the disclosures of which are incorporated herein by reference.

In one embodiment, the oxidized and modified carbon blacks are prepared from furnace carbon blacks. In another embodiment, the oxidized and modified carbon blacks are prepared from a carbon black having the following properties:

In another embodiment, the oxidized and modified carbon blacks are prepared from a carbon black having the following properties:
   OAN≥170 mL/100 g; and
   STSA ranging from 160 to 220 $m^2$/g.

In another embodiment, the oxidized and modified carbon blacks are prepared from a carbon black having the following properties:
   OAN≥170 mL/100 g; and
   a ratio of STSA/BET ranging from 0.7 to 1.

In another embodiment, the oxidized and modified carbon blacks are prepared from a carbon black having the following properties:
   OAN≥170 mL/100 g;
   STSA ranging from 160 to 220 $m^2$/g; and
   BET surface area ranging from 190 to 275 $m^2$/g.

In another embodiment, the oxidized and modified carbon blacks are prepared from a carbon black having the following properties:
   OAN≥170 mL/100 g;
   BET surface area≥150 $m^2$/g; and
   COAN ranging from 130 to 145 $m^2$/g.

In one embodiment, the OAN ranges from 170 to 220 m$^2$/g, e.g., from 170 to 210 m$^2$/g, from 180 to 220 m$^2$/g, from 180 to 210 m$^2$/g, from 190 to 220 m$^2$/g, or from 190 to 210 m$^2$/g. OAN can be determined according to ASTM-D2414. Without wishing to be bound by any theory, it has believed that the disclosed OAN values can be a significant factor in achieving high optical density values.

In one embodiment, the STSA ranges from 160 to 220 m$^2$/g, e.g., from 160 to 210 m$^2$/g, and in certain applications, the STSA ranges from 170 to 220 m$^2$/g, from 170 to 210 m$^2$/g, from 180 to 220 m$^2$/g, or from 180 to 220 m$^2$/g.

Additional descriptions of the carbon blacks used to prepare the oxidized and modified are described in U.S. Provisional Application No. 61/671,359, filed Jul. 13, 2012, and PCT Publication No. PCT/US2013/050295, the disclosures of which are incorporated herein by reference.

In one embodiment, the at least one pigment in the dispersion has a mean volume (mV) ranging from 0.1 to 0.18 µm. In another embodiment, the pigment has a $D_{10}$ ranging from 0.05 to 0.1 µm, such as a $D_{10}$ ranging from 0.06 to 0.1 µm, or from 0.07 to 0.1 µm. In one embodiment, the at least one pigment (e.g., oxidized or modified carbon black) has a $D_{50}$ ranging from 0.1 to 0.16 µm. In another embodiment, the at least one pigment (e.g., oxidized or modified carbon black) has a $D_{90}$ ranging from 0.18 to 0.25 µm, such as a D90 ranging from 0.15 to 0.24 µm, or a $D_{90}$ ranging from 0.18 to 0.24 µm.

Inkjet Ink Compositions

The aqueous dispersions disclosed herein can be used to formulate inkjet ink compositions. In one embodiment, an inkjet ink composition is prepared by combining the aqueous dispersion with at least one surfactant to further enhance the colloidal stability of the composition or to change the interaction of the ink with either the printing substrate, such as printing paper, or with the ink printhead. Various anionic, cationic and nonionic dispersing agents can be used in conjunction with the ink composition of the present invention, and these may be used neat or as a water solution. In one embodiment, the surfactant is present in an amount ranging from 0.05% to 5%, e.g., an amount ranging from 0.1% to 5%, or an amount ranging from 0.5% to 2%, by weight relative to the total weight of the inkjet ink composition.

Representative examples of anionic dispersants or surfactants include, but are not limited to, higher fatty acid salts, higher alkyldicarboxylates, sulfuric acid ester salts of higher alcohols, higher alkyl-sulfonates, alkylbenzenesulfonates, alkylnaphthalene sulfonates, naphthalene sulfonates (Na, K, Li, Ca, etc.), formalin polycondensates, condensates between higher fatty acids and amino acids, dialkylsulfosuccinic acid ester salts, alkylsulfosuccinates, naphthenates, alkylether carboxylates, acylated peptides, α-olefin sulfonates, N-acrylmethyl taurine, alkylether sulfonates, secondary higher alcohol ethoxysulfates, polyoxyethylene alkylphenylether sulfates, monoglycylsulfates, alkylether phosphates and alkyl phosphates, alkyl phosphonates and bisphosphonates, included hydroxylated or aminated derivatives. For example, polymers and copolymers of styrene sulfonate salts, unsubstituted and substituted naphthalene sulfonate salts (e.g. alkyl or alkoxy substituted naphthalene derivatives), aldehyde derivatives (such as unsubstituted alkyl aldehyde derivatives including formaldehyde, acetaldehyde, propylaldehyde, and the like), maleic acid salts, and mixtures thereof may be used as the anionic dispersing aids. Salts include, for example, Na$^+$, Li$^+$, K$^+$, Cs$^+$, Rb$^+$, and substituted and unsubstituted ammonium cations. Representative examples of cationic surfactants include aliphatic amines, quaternary ammonium salts, sulfonium salts, phosphonium salts and the like.

Representative examples of nonionic dispersants or surfactants that can be used in ink jet inks of the present invention include fluorine derivatives, silicone derivatives, acrylic acid copolymers, polyoxyethylene alkyl ether, polyoxyethylene alkylphenyl ether, polyoxyethylene secondary alcohol ether, polyoxyethylene styrol ether, ethoxylated acetylenic diols, polyoxyethylene lanolin derivatives, ethylene oxide derivatives of alkylphenol formalin condensates, polyoxyethylene polyoxypropylene block polymers, fatty acid esters of polyoxyethylene polyoxypropylene alkylether polyoxyethylene compounds, ethylene glycol fatty acid esters of polyethylene oxide condensation type, fatty acid monoglycerides, fatty acid esters of polyglycerol, fatty acid esters of propylene glycol, cane sugar fatty acid esters, fatty acid alkanol amides, polyoxyethylene fatty acid amides and polyoxyethylene alkylamine oxides. For example, ethoxylated monoalkyl or dialkyl phenols may be used. These nonionic surfactants or dispersants can be used alone or in combination with the aforementioned anionic and cationic dispersants.

The dispersing agents may also be a natural polymer or a synthetic polymer dispersant. Specific examples of natural polymer dispersants include proteins such as glue, gelatin, casein and albumin; natural rubbers such as gum arabic and tragacanth gum; glucosides such as saponin; alginic acid, and alginic acid derivatives such as propyleneglycol alginate, triethanolamine alginate, and ammonium alginate; and cellulose derivatives such as methyl cellulose, carboxymethyl cellulose, hydroxyethyl cellulose and ethylhydroxy cellulose. Specific examples of polymeric dispersants, including synthetic polymeric dispersants, include polyvinyl alcohols, polyvinylpyrrolidones, acrylic or methacrylic resins (often written as "(meth)acrylic") such as poly(meth)acrylic acid, acrylic acid-(meth)acrylonitrile copolymers, potassium (meth)acrylate-(meth)acrylonitrile copolymers, vinyl acetate-(meth)acrylate ester copolymers and (meth)acrylic acid-(meth)acrylate ester copolymers; styrene-acrylic or methacrylic resins such as styrene-(meth)acrylic acid copolymers, styrene-(meth)acrylic acid-(meth)acrylate ester copolymers, styrene-α-methylstyrene-(meth)acrylic acid copolymers, styrene-α-methylstyrene-(meth)acrylic acid-(meth)acrylate ester copolymers; styrene-maleic acid copolymers; styrene-maleic anhydride copolymers, vinyl naphthalene-acrylic or methacrylic acid copolymers; vinyl naphthalene-maleic acid copolymers; and vinyl acetate copolymers such as vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; and salts thereof.

In one embodiment, the dispersion can be formulated to provide an amount of modified pigment such that the final amount in the inkjet ink composition is effective to provide the desired image quality (for example, optical density) without detrimentally affecting the performance of the inkjet ink. In one embodiment, the pigment is present in the inkjet ink composition in an amount ranging from about 0.1% to about 20% based on the weight of the inkjet ink composition.

In one embodiment, in addition to the surfactant, the inkjet ink compositions can further comprise one or more suitable additives to impart a number of desired properties while maintaining the stability of the compositions. Other additives are well known in the art and include humectants, biocides and fungicides, binders such as polymeric binders, pH control agents, drying accelerators, penetrants, and the like. The amount of a particular additive will vary depending on a variety of factors but are generally present in an amount ranging between 0% and 40% based on the weight of the inkjet ink composition. Additionally, the inkjet ink compositions of the present invention may further incorporate dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, and lithium salts.

Humectants and water soluble organic compounds other than the at least one organic solvent may also be added to the inkjet ink composition of the present invention, e.g., for the purpose of preventing clogging of the nozzle as well as for providing paper penetration (penetrants), improved drying (drying accelerators), and anti-cockling properties. In one embodiment, the humectant is present in the aqueous dispersion in an amount such that the overall Hanson solubility parameters are not substantially affected (e.g., within ±1 $MPa^{0.5}$). In one embodiment, the humectant and/or water soluble compound is present in an amount ranging from 0.1% to 10%, e.g., an amount ranging from 0.1% to 5%.

Biocides and/or fungicides may also be added to the inkjet ink composition of the present invention. Biocides are important in preventing bacterial growth since bacteria are often larger than ink nozzles and can cause clogging as well as other printing problems. Examples of useful biocides include, but are not limited to, benzoate or sorbate salts, and isothiazolinones. In one embodiment, the biocides and/or fungicides are present in an amount ranging from 0.05% to 5%, e.g., an amount ranging from 0.1% to 5%.

One embodiment provides an inkjet ink composition prepared from an aqueous dispersion as disclosed herein, e.g., an aqueous dispersion comprising:
- at least one pigment present in an amount of at least 10% by weight relative to the total weight of the dispersion, the at least one pigment being selected from oxidized carbon blacks and modified carbon blacks having attached at least one organic group; and
- at least one organic solvent present in an amount of at least 10% by weight relative to the total weight of the dispersion, the at least one organic solvent having a Hansen hydrogen bonding parameter ($\delta_H$) ranging from 13 to 50 $MPa^{0.5}$, and a Hansen polarity parameter ($\delta_p$) ranging from 5 to 13 $MPa^{0.5}$,
- wherein the inkjet ink composition further comprises at least one surfactant.

Another embodiment provides a method of making an inkjet composition, comprising:
combining an aqueous dispersion with a surfactant,
wherein the at least one aqueous dispersion comprises any of the dispersions described herein, e.g., an aqueous dispersion comprising:
- at least one pigment present in an amount of at least 10% by weight relative to the total weight of the dispersion, the at least one pigment being selected from oxidized carbon blacks and modified carbon blacks having attached at least one organic group; and
- at least one organic solvent present in an amount of at least 10% by weight relative to the total weight of the dispersion, the at least one organic solvent having a Hansen hydrogen bonding parameter ($\delta_H$) ranging from 13 to 50 $MPa^{0.5}$, and a Hansen polarity parameter ($\delta_p$) ranging from 5 to 13 $MPa^{0.5}$, and wherein the surfactant is present in in an amount ranging from 0.05% to 5%, e.g., an amount ranging from 0.1% to 5%, or an amount ranging from 0.5% to 2%, by weight relative to the total weight of the inkjet ink composition.

In one embodiment, the combining further comprises combining the aqueous dispersion with the surfactant and at least one additive selected from humectants, biocides and fungicides, binders such as polymeric binders, pH control agents, drying accelerators, penetrants, etc. In one embodiment, the at least one additive is present in in an amount ranging from 0.05% to 5%, e.g., an amount ranging from 0.1% to 5%, or an amount ranging from 0.5% to 2%, by weight relative to the total weight of the inkjet ink composition.

EXAMPLES

Example 1

This Example describes the ozonation of two similar carbon black aqueous dispersion, where the carbon black has the initial (prior to ozonation) properties listed in Table 1. Details for preparing the carbon black of Table 1 can be found in U.S. Provisional Application No. 61/671,359, filed Jul. 13, 2012, and PCT Publication No. PCT/US2013/050295, the disclosures of which are incorporated herein by reference.

TABLE 1

| [data for M-10575] | |
|---|---|
| BET ($m^2/g$) | 257.0 |
| STSA ($m^2/g$) | 194.0 |
| OAN (mL/100 g) | 178.5 |
| COAN (mL/100 g) | 128.5 |

Two carbon black samples were subjected to ozonation according to the following procedure. A carbon black charge (300 g) was combined with water (6 L) and this mixture was homogenized with a rotor-stator at 8,000-10,000 rpm for 3-5 minutes. The resulting slurry was added to the reservoir of the ozone reactor assembly, in which the reservoir pH was maintained at 9.0. The recirculation pump was operated at a rate of 70-90 L/min to circulate the slurry throughout the reactor. Ozone gas (3-5 wt %) was introduced to the slurry via an inlet at the venturi tube at a gas flow rate of 6-10 L/min. Ozonation was performed on the two samples over a time period of 10 hours (Sample A) and 7 hours (Sample B), respectively, at a reaction temperature of 30-40° C.

The samples were heat treated to 80° C. post reaction on a hot plate for 2 hrs followed by diafiltration to a permeate conductivity of under 100 µS/cm at ~15% solids. The samples were then diluted to ~5% solids and centrifuged at 600 mL/min at 13276 rpm. After re-concentrating via a diafiltration membrane to ~16% solids, biocide was added (0.2% w/w) and the samples were then adjusted to 15% solids. The samples were then passed through a 0.5 µm Pall filter.

The hydrodynamic properties of the samples are listed in Table 2.

TABLE 2

| Property | Sample A | Sample B |
|---|---|---|
| Percent solids [%] | 14.94 | 14.91 |
| pH | 9.16 | 8.98 |

TABLE 2-continued

| Property | Sample A | Sample B |
| --- | --- | --- |
| Nanotrac mV [nm] | 0.1663 | 0.167 |
| Nanotrac D10 [nm] | 0.1013 | 0.0977 |
| Nanotrac D50 [nm] | 0.1536 | 0.1608 |
| Nanotrac D90 [nm] | 0.2487 | 0.2428 |
| Nanotrac D100 [nm] | 0.578 | 0.486 |
| Viscosity [cPs] | 9.16 | 8.86 |
| Conductivity [uS/cm] | 1000 | 950 |
| Sodium [ppm] | 14400 | 12678 |
| LPC >1.0 | 1.50E+06 | 3.30E+06 |
| LPC >0.5 | 6.10E+08 | 3.10E+09 |

Example 2

This Example describes the preparation of dispersions containing added solvents, for each of which the Hansen hydrogen bonding parameter ($\delta_H$) and Hansen polarity parameter ($\delta_P$) are listed in Table 3 below.

TABLE 3

| Solvent | $\delta_P$ | $\delta_H$ |
| --- | --- | --- |
| Glycerol | 11.3 | 27.2 |
| Ethylene glycol | 11.0 | 26.0 |
| 1,3-propanediol | 13.5 | 23.2 |
| Triethylene glycol | 12.5 | 18.6 |
| Diethylene glycol | 12.0 | 19.0 |
| Tetraethylene glycol | 9.1 | 12.9 |
| 1,2-hexanediol | 7.4 | 16.7 |
| Triethylene glycol monobutyl ether (TEGMBE) | 7.1 | 11.2 |
| Trimethylol propane | 10.5 | 20.0 |

TABLE 3-continued

| Solvent | $\delta_P$ | $\delta_H$ |
| --- | --- | --- |
| Sorbitol | 12.8 | 44.8 |
| Xylitol | 12.7 | 36.9 |
| Water | 16.0 | 42.3 |

For each of Sample A and Sample B, dispersions were prepared containing 10% and 20% by weight of the added solvent of Table 3.

The viscosity, conductivity, and particle size for each sample were tested upon: (a) no aging, and (b) after 7 days aging at 70°. These values and % changes are listed in Tables 4-6 below:

TABLE 4

Viscosity

| | Sample A | | | | Sample B | | | |
| --- | --- | --- | --- | --- | --- | --- | --- | --- |
| Added Solvent | Viscosity (initial) | Δ (% from water) | Viscosity (7 days, 70° C.) | Δ (% from initial) | Viscosity (initial) | Δ (% from water) | Viscosity (7 days, 70° C.) | Δ (% from initial) |
| water (control) | 4.84 | | 3.58 | −26 | 4.66 | | 3.66 | −21 |
| 20% glycerol | 8.56 | 77 | −25% | −25 | 8.38 | 80 | 6.60 | −21 |
| 20% ethylene glycol | 7.74 | 60 | 6.18 | −20 | 7.56 | 62 | 6.24 | −17 |
| 20% diethylene glycol | 8.44 | 74 | 6.78 | −20 | 8.20 | 76 | 6.70 | −18 |
| 20% 1,2-hexanediol | 9.18 | 90 | 7.56 | −18 | 9.06 | 94 | 7.46 | −18 |
| 20% Trimethylol propane | 5.70 | 18 | 4.76 | −16 | 5.72 | 23 | 4.82 | −16 |
| w/ 20% 2-pyrrolidone | 7.42 | 53 | 6.72 | −9 | 7.36 | 58 | 6.54 | −11 |
| w/ 20% 1,3-propanediol | 8.54 | 76 | 8.50 | 0 | 8.38 | 80 | 7.96 | −5 |
| 20% 1,3-dimethyl-2-imidazolidinone | 7.52 | 55 | 9.28 | +23 | 7.36 | 58 | 6.86 | −7 |
| 20% triethylene glycol | 7.82 | 62 | 8.24 | +5 | 7.60 | 63 | 7.68 | +1 |
| 20% tetraethylene glycol | 8.58 | 77 | 15.00 | +75 | 7.54 | 62 | 11.60 | +54 |
| 20% TEGMBE | 11.80 | 144 | 10.50 | −11 | 8.38 | 80 | 8.74 | +4 |
| 10% 2-pyrrolidone | 5.74 | 19 | 4.48 | −22 | 5.58 | 20 | 4.52 | −19 |
| 10% glycerol | 6.18 | 28 | 4.66 | −25 | 6.10 | 31 | 4.86 | −20 |
| 10% ethylene glycol | 5.96 | 23 | 4.72 | −21 | 5.86 | 26 | 4.68 | −20 |
| 10% 1,3-propanediol | 6.22 | 29 | 4.96 | −20 | 6.10 | 31 | 4.86 | −20 |
| 10% triethylene glycol | 5.72 | 18 | 4.80 | −16 | 5.58 | 20 | 5.00 | −10 |
| 10% diethylene glycol | 6.18 | 28 | 4.70 | −24 | 6.00 | 29 | 4.58 | −24 |
| 10% 1,3-dimethyl-2-imidazolidinone | 5.60 | 16 | 4.60 | −18 | 5.48 | 18 | 4.40 | −20 |
| 10% tetraethylene glycol | 5.22 | 8 | 5.52 | +6 | 5.10 | 9 | 5.70 | +12 |
| 10% 1,2-hexanediol | 5.94 | 23 | 4.84 | −19 | 5.86 | 26 | 4.96 | −15 |
| 10% TEGMBE | 5.26 | 9 | 4.60 | −13 | 5.44 | 17 | 4.94 | −9 |
| 10% Trimethylol propane | 5.00 | 3 | 4.02 | −20 | 4.86 | 4 | 4.12 | −15 |
| 10% xylitol | 5.60 | 16 | 4.70 | −16 | 5.54 | 19 | 4.82 | −13 |
| 10% sorbitol | 5.72 | 18 | 4.78 | −16 | 5.62 | 21 | 4.86 | −14 |

TABLE 5

Conductivity

| | Sample A | | Sample B | |
| --- | --- | --- | --- | --- |
| Added Solvent | Viscosity (initial) | Δ (% from water) | Viscosity (initial) | Δ (% from water) |
| water (control) | 850 | | 825 | |
| 20% glycerol | 490 | −42 | 460 | −44 |
| 20% ethylene glycol | 475 | −44 | 460 | −44 |
| 20% diethylene glycol | 490 | −42 | 425 | −48 |
| 20% 1,2-hexanediol | 550 | −35 | 470 | −43 |
| 20% Trimethylol propane | 440 | −48 | 425 | −48 |
| w/ 20% 2-pyrrolidone | 575 | −32 | 550 | −33 |
| w/ 20% 1,3-propanediol | 405 | −52 | 390 | −53 |
| 20% 1,3-dimethyl-2-imidazolidinone | 625 | −26 | 600 | −27 |
| 20% triethylene glycol | 700 | −18 | 675 | −18 |

TABLE 5-continued

Conductivity

| | Sample A | | Sample B | |
|---|---|---|---|---|
| Added Solvent | Viscosity (initial) | Δ (% from water) | Viscosity (initial) | Δ (% from water) |
| 20% tetraethylene glycol | 1125 | +32 | 1025 | +24 |
| 20% TEGMBE | 875 | +3 | 850 | +3 |
| 10% 2-pyrrolidone | 725 | −15 | 725 | −12 |
| 10% glycerol | 675 | −21 | 650 | −21 |
| 10% ethylene glycol | 675 | −21 | 650 | −21 |
| 10% 1,3-propanediol | 650 | −24 | 625 | −24 |
| 10% triethylene glycol | 825 | −3 | 800 | −3 |
| 10% diethylene glycol | 650 | −24 | 650 | −21 |
| 10% 1,3-dimethyl-2-imidazolidinone | 825 | −3 | 775 | −6 |
| 10% tetraethylene glycol | 1200 | +41 | 1150 | +39 |
| 10% 1,2-hexanediol | 725 | −15 | 700 | −15 |
| 10% TEGMBE | 1000 | +18 | 950 | +15 |
| 10% trimethylol propane | 650 | −24 | 625 | −24 |
| 10% xylitol | 731 | −14 | 727 | −12 |
| 10% sorbitol | 764 | −10 | 738 | −11 |

TABLE 6

Particle Size ($D_{50}$, μm)

| | Sample A | | | Sample B | | |
|---|---|---|---|---|---|---|
| Added Solvent | $D_{50}$ (initial) | $D_{50}$ (7 days, 70° C.) | Δ (% from initial) | $D_{50}$ (initial) | $D_{50}$ (7 days, 70° C.) | Δ (% from initial) |
| water (control) | 0.1567 | 0.1515 | −3 | 0.1597 | 0.1529 | −4 |
| 20% glycerol | 0.1506 | 0.1408 | −7 | 0.1616 | 0.1566 | −3 |
| 20% ethylene glycol | 0.1555 | 0.1557 | 0 | 0.1582 | 0.1609 | +2 |
| 20% diethylene glycol | 0.1533 | 0.1532 | 0 | 0.1442 | 0.1580 | +10 |
| 20% 1,2-hexanediol | 0.1413 | 0.1481 | +5 | 0.1555 | 0.1474 | −5 |
| 20% Trimethylol propane | 0.1549 | 0.1349 | −13 | 0.1591 | 0.1526 | −4 |
| 20% 2-pyrrolidone | 0.1636 | 0.1511 | −8 | 0.1480 | 0.1680 | +14 |
| 20% 1,3-propanediol | 0.1503 | 0.1621 | +8 | 0.1502 | 0.1582 | +5 |
| 20% 1,3-dimethyl-2-imidazolidinone | 0.1663 | 0.1632 | −2 | 0.1539 | 0.1548 | +1 |
| 20% triethylene glycol | 0.1609 | 0.1651 | +3 | 0.1620 | 0.1590 | −2 |
| 20% tetraethylene glycol | 0.1481 | 0.1733 | +17 | 0.1540 | 0.1714 | +11 |
| 20% TEGMBE | 0.1505 | 0.1746 | +16 | 0.1539 | 0.1622 | +5 |
| 10% 2-pyrrolidone | 0.1495 | 0.1443 | −3% | 0.1504 | 0.1488 | −1% |
| 10% glycerol | 0.1666 | 0.1584 | −5% | 0.1607 | 0.1574 | −2% |
| 10% ethylene glycol | 0.1557 | 0.1548 | −1% | 0.1524 | 0.1593 | +5% |
| 10% 1,3-propanediol | 0.1554 | 0.1542 | −1% | 0.1495 | 0.1630 | +9% |
| 10% triethylene glycol | 0.1635 | 0.1530 | −6% | 0.1565 | 0.1479 | −5% |
| 10% diethylene glycol | 0.1543 | 0.1626 | +5% | 0.1568 | 0.1599 | +2% |
| 10% 1,3-dimethyl-2-imidazolidinone | 0.1552 | 0.1553 | 0% | 0.1574 | 0.1537 | −2% |
| 10% tetraethylene glycol | 0.1478 | 0.1515 | +3% | 0.1533 | 0.1605 | +5% |
| 10% 1,2-hexanediol | 0.1533 | 0.1533 | 0% | 0.1616 | 0.1527 | −6% |
| 10% TEGMBE | 0.1512 | 0.1504 | −1% | 0.1564 | 0.1516 | −3% |
| 10% trimethylol propane | 0.1542 | 0.1505 | −2% | 0.1489 | 0.1469 | −1% |
| 10% xylitol | 0.1620 | 0.1660 | +2% | 0.1593 | 0.1621 | +2% |
| 10% sorbitol | 0.1640 | 0.1650 | +1% | 0.1641 | 0.1653 | +1% |

From the data of Tables 4-6, one can apply the criteria for a stable dispersion, namely, a dispersion having at least three of the following properties selected from:

(a) the conductivity does not increase;

(b) $D_{50}$ does not increase by more than 5% upon 7 days aging at 70° C.;

(c) the viscosity does not increase upon 7 days aging at 70° C.; and (d) the viscosity does not increase by more than 100%.

It can be seen that solvents such as glycerol, trimethylol propane, xylitol, sorbitol, ethylene glycol, 2-pyrrolidone, and 1,2-hexanediol, satisfies two or more of the properties (a) to (d). According to Table 3, these solvents have Hansen solubility parameters within the disclosed ranges. In contrast, solvents having Hansen solubility parameters outside the disclosed ranges do not result in stable dispersions, e.g., tetraethylene glycol and TEGMBE.

The use of the terms "a" and "an" and "the" are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. An aqueous dispersion comprising:
   at least one pigment present in an amount of at least 5% by weight relative to the total weight of the dispersion, the at least one pigment being selected from oxidized carbon blacks and modified carbon blacks having attached at least one organic group; and at least one organic solvent present in an amount of at least 10% by weight relative to the total weight of the dispersion, the at least one organic solvent having a Hansen hydrogen bonding parameter ($\delta_H$) ranging from 13 to 50 MPa$^{0.5}$, and a Hansen polarity parameter ($\delta_p$) ranging from 5 to 13 MPa$^{0.5}$, wherein the dispersion is substantially free of a surfactant, and wherein the oxidized and modified carbon blacks are prepared from a carbon black having the following properties:

OAN≥170 mL/100 g; and

STSA ranging from 160 to 220 m$^2$/g.

2. The dispersion of claim 1, wherein the at least one organic solvent has a Hansen hydrogen bonding parameter ($\delta_H$) ranging from 15 to 50 MPa$^{0.5}$.

3. The dispersion of claim 1, wherein the at least one organic solvent has a Hansen polarity parameter ($\delta_p$) ranging from 7 to 13 MPa$^{0.5}$.

4. The dispersion of claim 1, wherein the at least one organic solvent is selected from alcohols.

5. The dispersion of claim 1, wherein the at least one organic solvent is selected from diols and polyols.

6. The dispersion of claim 1, wherein the at least one organic solvent is selected from alkylene diols and alkylene polyols.

7. The dispersion of claim 1, wherein the at least one organic solvent is selected from glycerol, ethylene glycol, 1,2-hexanediol, diethylene glycol, trimethylolpropane, 2-pyrrolidone, triethylene glycol, 1,3-propanediol, 1,3-dimethyl-2-imidazolidinone, 1,2,3,4-tetrahydroxybutane, bis(2-hydroxyethyl)-5,5-dimethylhydantoin, propylene glycol, dipropylene glycol, tripropylene glycol, N-(2-hydroxyethyl)-2-pyrrolidone, trimethylene glycol, 1,4-butanediol, and ethylene glycol monomethyl ether.

8. The dispersion of claim 1, wherein the at least one organic solvent is present in an amount ranging from 10% to 40% by weight.

9. The dispersion of claim 1, wherein the at least one pigment is selected from oxidized carbon blacks.

10. The dispersion of claim 9, wherein the oxidized carbon blacks are selected from ozone-oxidized carbon blacks.

11. The dispersion of claim 1, wherein the at least one pigment is present in an amount ranging from 10% to 40%.

12. The dispersion of claim 1, wherein upon addition of at least 10% of the at least one organic solvent, the dispersion possesses at least one of the properties selected from:
   (a) the conductivity does not increase;
   (b) $D_{50}$ does not increase by more than 5% upon 7 days aging at 70° C.;
   (c) the viscosity does not increase upon 7 days aging at 70° C.; and
   (d) the viscosity does not increase by more than 100%.

13. The dispersion of claim 1, wherein upon addition of at least 20% of the at least one organic solvent, the dispersion possesses at least one of the properties selected from:
   (a) the conductivity does not increase;
   (b) $D_{50}$ does not increase by more than 5% upon 7 days aging at 70° C.;
   (c) the viscosity does not increase upon 7 days aging at 70° C.; and
   (d) the viscosity does not increase by more than 100%.

14. The dispersion of claim 1, wherein the at least one pigment is selected from modified carbon blacks having attached at least one organic group.

15. The dispersion of claim 1, wherein the at least one pigment is selected from modified carbon blacks and the at least one organic group comprises at least one substituent selected from carboxylic acids, sulfonic acids, phosphonic acids, hydroxyls, amines, and esters, amides, and salts thereof.

16. An inkjet ink composition, prepared from the aqueous dispersion of claim 1.

17. An aqueous dispersion comprising:
at least one pigment selected from oxidized carbon blacks, wherein the pigment is present in an amount ranging from 10% to 40% by weight relative to the total weight of the dispersion; and at least one organic solvent selected from alcohols present in an amount of at least 10% by weight relative to the total weight of the dispersion, the at least one organic solvent having a Hansen hydrogen bonding parameter ($\delta_H$) ranging from 13 to 50 MPa$^{0.5}$, and a Hansen polarity parameter ($\delta_p$) ranging from 5 to 13 MPa$^{0.5}$, wherein the dispersion is substantially free of a surfactant, and wherein the oxidized carbon blacks are prepared from a carbon black having the following properties:

OAN≥170 mL/100 g; and

STSA ranging from 160 to 220 m$^2$/g.

18. The aqueous dispersion of claim 17, wherein the alcohols are selected from the diols and polyols.

19. The aqueous dispersion of claim 17, are selected the alcohols are selected from alkylene diols and alkylene polyols.

20. An aqueous dispersion comprising:
at least one pigment present in an amount of at least 10% by weight relative to the total weight of the dispersion, the at least one pigment being selected from oxidized carbon blacks and modified carbon blacks having attached at least one organic group; and at least one organic solvent present in an amount of at least 10% by weight relative to the total weight of the dispersion, wherein, the at least one organic solvent is selected from glycerol, ethylene glycol, 1,2-hexanediol, diethylene glycol, trimethylolpropane, 2-pyrrolidone, triethylene glycol, 1,3-propanediol, 1,3-dimethy1-2-midazolidinone, 1,2,3,4-tetrahydroxybutane, bis(2-hydroxyethyl)-5,5-dimethylhydantoin, propylene glycol, dipropylene glycol, tripropylene glycol, N-(2-hydroxyethyl)-2-pyrrolidone, trimethylene glycol, 1,4-butanediol, and ethylene glycol monomethyl ether, wherein the dispersion is substantially free of a surfactant, and wherein the oxidized and modified carbon blacks are prepared from a carbon black having the following properties:

OAN≥170 mL/100 g; and

STSA ranging from 160 to 220 m$^2$/g.

21. The dispersion of claim 20, wherein the at least one organic solvent is selected from glycerol, trimethylolpropane, xylitol, sorbitol, 2-pyrrolidone, ethylene glycol, 1,2-hexanediol, and 1,3-dimethyl-2-imidazolidinone.

22. The dispersion of claim 20, wherein the at least one organic solvent is selected from trimethylolpropane, xylitol, sorbitol, 2-pyrrolidone, ethylene glycol, 1,2-hexanediol, and 1,3-dimethyl-2-imidazolidinone.

23. The dispersion of claim 20, wherein the at least one organic solvent is selected from glycerol, trimethylolpropane, xylitol, sorbitol, 2-pyrrolidone, 1,2-hexanediol, and 1,3-dimethyl-2-imidazolidinone.

24. The dispersion of claim 20, wherein the at least one organic solvent is selected from glycerol, ethylene glycol, 1,2-hexanediol, diethylene glycol, trimethylolpropane, triethylene glycol, 1,3-propanediol, 1,2,3,4-tetrahydroxybutane, bis(2-hydroxyethyl)-5,5-dimethylhydantoin, propylene glycol, dipropylene glycol, tripropylene glycol, N-(2-hydroxyethyl)-2-pyrrolidone, trimethylene glycol, 1,4-butanediol, and ethylene glycol monomethyl ether.

25. The dispersion of claim 20, wherein the at least one organic solvent is selected from glycerol, ethylene glycol, 1,2-hexanediol, diethylene glycol, trimethylolpropane, triethylene glycol, 1,3-propanediol, 1,2,3,4-tetrahydroxybutane, bis(2-hydroxyethyl)-5,5-dimethylhydantoin, propylene glycol, dipropylene glycol, tripropylene glycol, trimethylene glycol, and 1,4-butanediol.

26. The dispersion of claim 20, wherein the at least one organic solvent is selected from glycerol, trimethylolpropane, xylitol, sorbitol, ethylene glycol, and 1,2-hexanediol.

27. The dispersion of claim 20, wherein the at least one organic solvent is selected from trimethylolpropane, xylitol, sorbitol, ethylene glycol, and 1,2-hexanediol.

28. The dispersion of claim 20, wherein the at least one organic solvent is selected from glycerol, trimethylolpropane, xylitol, sorbitol, and 1,2-hexanediol.

29. The dispersion of claim 20, wherein the at least one organic solvent is selected from glycerol and ethylene glycol.

30. The dispersion of claim 20, wherein the at least one organic solvent is selected from glycerol.

31. A method of preparing an aqueous dispersion, comprising:

providing a composition comprising at least 10 wt% of a pigment selected from oxidized carbon blacks and modified carbon blacks having attached at least one organic group;

adding to the composition at least one organic solvent to prepare a dispersion substantially free of a surfactant, the at least one organic solvent being present in an amount of at least 10% by weight relative to the total weight of the dispersion, whereupon the adding, the dispersion possesses at least one of the properties selected from:
(a) the conductivity does not increase;
(b) $D_{50}$ does not increase by more than 5% upon 7 days aging at 70° C.;
(c) the viscosity does not increase upon 7 days aging at 70° C.; and
(d) the viscosity does not increase by more than 100%, and wherein the oxidized and modified carbon blacks are prepared from a carbon black having the following properties:

OAN≥170 mL/100 g; and
STSA ranging from 160 to 220 m$^2$/g.

32. A method of preparing an inkjet ink composition, comprising:
combining the aqueous dispersion of claim 1; and
adding at least one surfactant to the aqueous dispersion.

33. The method of claim 32, wherein the at least one surfactant is present in an amount ranging from 0.1% to 5% by weight relative to the total weight of the inkjet ink composition.

34. The method of claim 31, wherein upon the adding, the dispersion possesses at least two of the properties (a) to (d).

* * * * *